(12) United States Patent
You et al.

(10) Patent No.: US 11,920,726 B2
(45) Date of Patent: Mar. 5, 2024

(54) BALANCE MECHANISM AND MOUNTING BRACKET

(71) Applicant: NINGBO TUOTUO RIVER DESIGN COMPANY, Zhejiang (CN)

(72) Inventors: Xiaodong You, Zhejiang (CN); Hongjun Wang, Zhejiang (CN)

(73) Assignee: Ningbo Tuotuo River Design Company, Ningbo (CN)

( * ) Notice: Subject to any disclaimer, the term of this patent is extended or adjusted under 35 U.S.C. 154(b) by 169 days.

(21) Appl. No.: 17/393,570

(22) Filed: Aug. 4, 2021

(65) Prior Publication Data
US 2022/0390061 A1 Dec. 8, 2022

(30) Foreign Application Priority Data
Jun. 4, 2021 (CN) .......................... 202121243837.0

(51) Int. Cl.
*F16M 13/02* (2006.01)
*A47B 97/00* (2006.01)
*H04N 5/655* (2006.01)

(52) U.S. Cl.
CPC ........... *F16M 13/02* (2013.01); *A47B 97/001* (2013.01); *F16M 2200/041* (2013.01); *F16M 2200/044* (2013.01); *H04N 5/655* (2013.01)

(58) Field of Classification Search
CPC .... F16M 2200/06; F16M 11/06; F16M 11/10; F16M 2200/04; F16M 2200/041; F16M 13/02; F16M 13/00; A47B 97/001

USPC .......... 248/123.11, 123.2, 122.1, 125.9, 133, 248/139, 371, 162.1, 404, 406.2, 919, 248/920, 921, 922, 923, 682, 686, 689

See application file for complete search history.

(56) References Cited

U.S. PATENT DOCUMENTS

| | | | |
|---|---|---|---|
| 5,718,406 A * | 2/1998 | Long | A47B 9/02 248/162.1 |
| 8,724,037 B1 | 5/2014 | Massey | |
| 8,925,154 B2 * | 1/2015 | Ergun | F16M 11/28 16/342 |
| 9,976,699 B2 * | 5/2018 | Hung | F16M 11/24 |
| 10,415,743 B2 * | 9/2019 | Hsu | F16M 13/022 |
| 2013/0233984 A1 * | 9/2013 | Huang | F16M 11/046 248/162.1 |

\* cited by examiner

*Primary Examiner* — Alfred J Wujciak
(74) *Attorney, Agent, or Firm* — Knobbe, Martens, Olson & Bear LLP (57) ABSTRACT

The embodiment of the present application provides a balance mechanism and a mounting bracket. Wherein, the balance mechanism includes: a mounting part; a sliding part, which is slidably connected to the mounting part; a spring, the first end of the spring is fixed to the sliding part; an adjuster, which has a third end and a fourth end opposite to the third end, wherein the third end is connected to the mounting part, and the fourth end is connected to the second end of the spring. The adjuster is configured to adjust the spring, so as to stretch and compress the spring. The embodiments of the present application can reduce the cost of the balance mechanism and thereby reduce the cost of the mounting bracket.

16 Claims, 8 Drawing Sheets

BALANCE MECHANISM AND MOUNTING BRACKET

TECHNICAL FIELD

This application relates to the technical field of television mounting equipment, and in particular to a balance mechanism and an mounting bracket.

BACKGROUND

Free balanced hovering technology is a technology that allows users to easily adjust height of a TV without using tools. Users only need to move the TV to the desired height to fix the TV at that height. It meets the needs of users to face the TV in a comfortable posture.

In related art, a mounting bracket used to mount the TV usually adopts a gas spring to achieve the effect of free balanced hovering. However, gas spring is disadvantageous for high cost.

SUMMARY

The object of the present application is to provide a balance mechanism and mounting bracket to reduce the cost of the balance mechanism, and thereby to reduce the cost of the mounting bracket. The specific technical solutions are as follows:

According to one aspect of the embodiment of the present application, a balance mechanism is provided, including:
mounting part;
sliding part, which is slidably connected to the mounting part;
spring, the first end of the spring is fixed to the sliding part;
adjuster, which has a third end and a fourth end opposite the third end, the third end is connected to the mounting part, and the fourth end is connected to the second end of the spring, the adjuster is configured to adjust the spring, so as to stretch and compress the spring.

In use of the balance mechanism 1 of the present application, the first end of the spring of the balance mechanism is connected to the base or the upper arm, and the end of the mounting part away form the sliding part is connected to the lower arm, and the connecting head of the mounting bracket can fix the panel. When using the mounting bracket to secure a television on a wall, the base can be secured to the wall and the television is mounted on the panel. Thus, when the television is secured to the connecting head, the television has a downward trend and generate a clockwise gravitational torque under the action of its own gravity; at this time, by operating the adjuster the spring is stretched and generates an upward force on the connecting head and the television, thereby generating a counterclockwise elastic torque that counteracts the gravity torque, which in turn enables the television to be secured at this height regardless of the original height of the television, that is, the mounting bracket is in balance with the television. In the process of adjusting the height of the television, the distance between the connector point of the balance mechanism and the base or the upper arm and the connector point of the balance mechanism and the lower arm changes, and since the sliding part is slidably connected to the mounting part, the sliding part therefore in this process can slide on the mounting part such that the total length of the balance mechanism is changed to adapt to the change in distance between the two connection points.

In some embodiments, the mounting part comprises two first side plates opposite to each other and a first bottom plate fixed between the two first side plates, each of the two first side plates has a first flanging arranged inward from the edge thereof;
the sliding part is located between the two first side plates, and the first flanging is used to limit the sliding part.

In some embodiments, the sliding part includes two second side plates opposite to each other, and a first connector fixed between the two second side plates, and the first end of the spring is secured to the first connection, and the second side plate is located between the two first side plates.

In some embodiments, each of the two first side plates has a first sliding groove provided thereon;
the balance mechanism further comprises a limiter, which is secured to the second end of the spring, and both ends of the limiter are respectively located in the first sliding grooves of the two first side plates.

In some embodiments, the mounting part further comprises a fixing member fixed between the two first side plates, an outer thread is provided on the outer surface of the adjuster, and the adjuster is arranged to pass through the fixing member in a rotatable manner;
the second end of the spring is fixed with a second connector, and the second connector is provided with an internal thread, which matches with the external thread.

In some embodiments, the first side plates and the second side plates each has a limiting structure provided thereon, and the limiting structures are configured to limit the displacement of the first side plates relative to the second side plates.

In some embodiments, a second sliding groove is provided on the first bottom plate, a protrusion is provided on the second end of the spring, and the protrusion is located in the second sliding groove;
a scale is provided on a surface of the first bottom plate away from the first side plate.

In some embodiments, the number of the spring is at least two, and the at least two springs are arranged side by side.

Another aspect of the embodiment of the present application provides a mounting bracket, including: a base, a connecting head, an upper arm, a lower arm, and a balance mechanism according to any one of the foregoing technical schemes, the upper arm and the lower arm are both connected between the base and the connecting head, and a parallelogram structure is formed between the base, the connecting head, the upper arm and the lower arm, the first end of spring of the balance mechanism is connected to the base or the upper arm, and an end of the mounting partion of the balance mechanism away from the sliding part is connected to the lower arm.

In some embodiments, the base comprises a third bottom plate and two third side plates fixed to the third substrate, the balance mechanism is connected between the two third side plates.

BRIEF DESCRIPTION OF THE DRAWINGS

In order to explain the embodiments of the present application and the technical scheme of the prior art more clearly, the drawings used in the prior art and the embodiments will be described briefly in the following, and it is apparent that the drawings in the description below are only some embodiments of the present application and those skilled in the art can obtain other embodiments according to these drawings without creative efforts.

Reference numeral: 1—balance mechanism; 11—mounting part; 111—the first side plate; 1111—the first sliding groove; 112—the first bottom plate; 1121—the second sliding groove; 113—the first flanging; 114—fixing member; 115—limiting structure; 116—extension section; 117—scale; 12—sliding part; 121—the second side plate; 122—the first connection; 123—the second bottom plate; 124—the second flanging; 125—protrusion section; 1221—U-shaped plate; 1222—connecting plate; 13—spring; 131—the first end; 132—the second end; 133—protrusion; 14—adjuster; 141—the third end; 142—the fourth end; 15—limiter; 16—the second connection; 161—nut; 2—base; 21—the third bottom plate; 22—the third side plate; 3—upper arm; 4—lower arm; 5—connecting head; 6—wall; 7—panel.

DETAILED DESCRIPTION OF THE INVENTION

The technical solution in the embodiments of the present application will be clearly and completely described in conjunction with the drawings in the embodiments of the present application, obviously, the embodiments described are only part of the embodiments of the present application and not all of them. Based on the embodiments in the present application, all other embodiments obtained by those of ordinary skilled in the art on the basis of the present application fall under the protection of the present application.

In oder to reduce the cost of the balance mechanism 1, and thereby to reduce the cost of the mounting bracket, embodiments of the present application provide a balance mechanism 1 and a mounting bracket.

Figure 1:
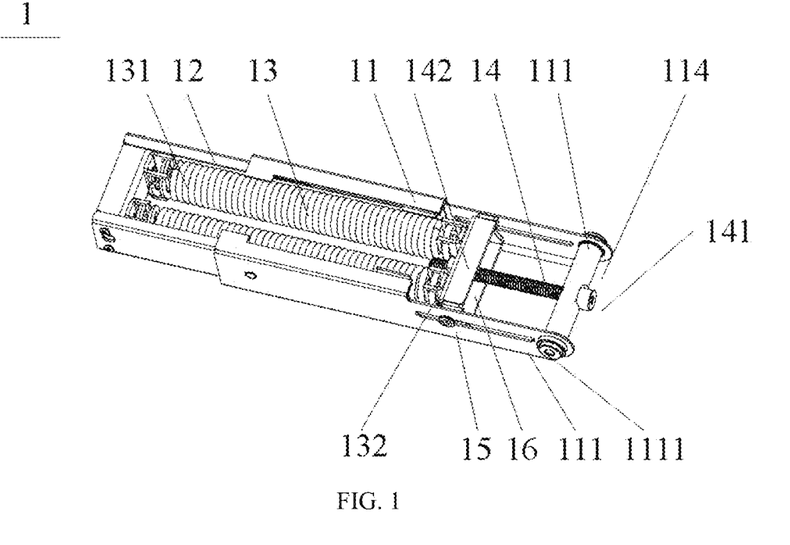
FIG. 1 is a schematic structural diagramm of a balance mechanism according to an embodiment of the present application.

As shown in FIG. 1, some embodiments of the present application provide a balance mechanism 1, including: a mounting part 11, a sliding part 12, a spring 13, and an adjuster 14. The sliding part 12 is slidably connected to the mounting part 11. The first end 131 of the spring 13 is fixed to the sliding part 12. The adjuster 14 has a third end 141 and a fourth end 142 opposite to the third end 141, and the third end 141 is connected to the mounting part 11, and the fourth end 142 is connected to the second end 132 of the spring 13, the adjustment member 14 is configured to adjust the spring 13, so as to stretch and compress the spring 13.

Figure 2:
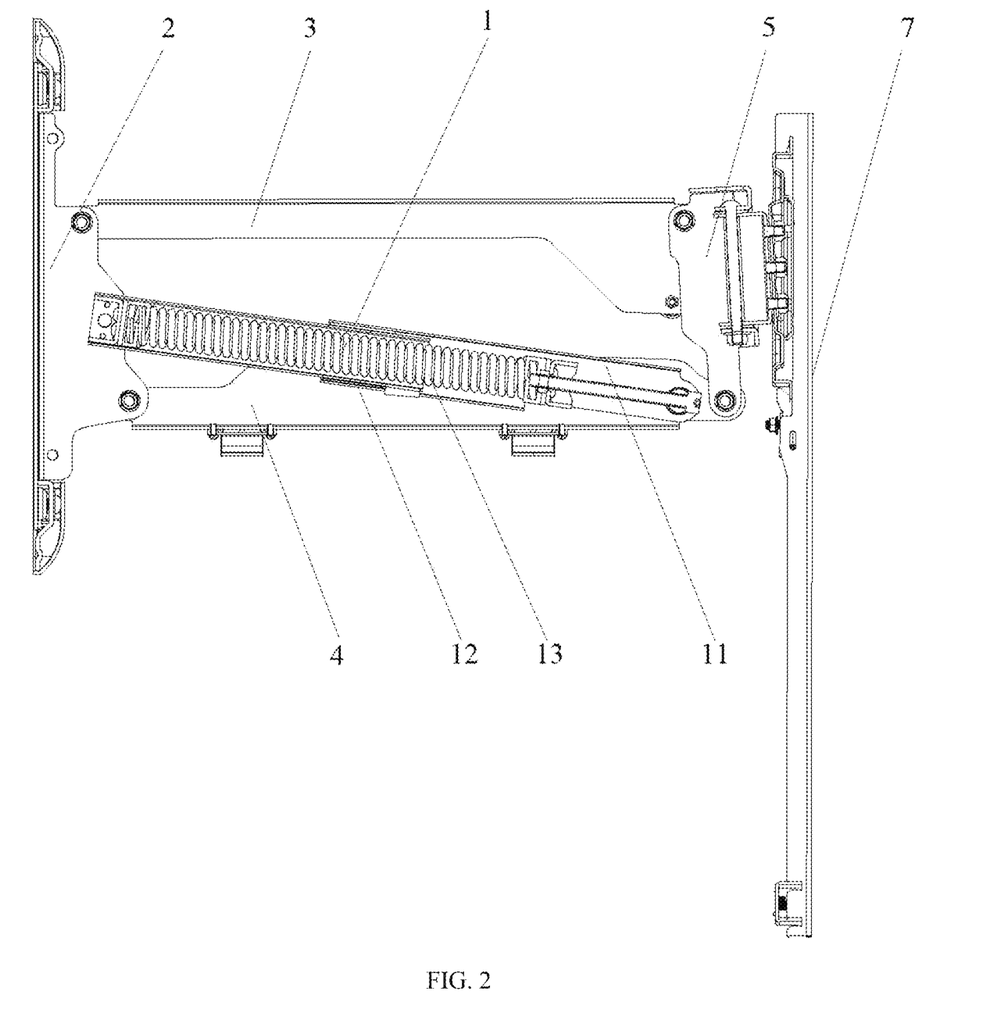
FIG. 2 is a schematic structural diagram of the mounting bracket of the present application in a first state.

As shown in FIG. 2, in use of the balance mechanism 1 of the present application, the first end 131 of the spring 13 of the balance mechanism 1 is connected to the base 2 or the upper arm 3, and the end of the mounting part 11 away form the sliding part 12 is connected to the lower arm 4, and the connecting head 5 of the mounting bracket can fix the panel 7. When using the mounting bracket to secure a television on the wall 6, the base 2 can be secured to the wall 6 and the television is mounted on the panel 7. Thus, when the television is secured to the connecting head 5, the television has a downward trend and generate a clockwise gravitational torque under the action of its own gravity; at this time, by operating the adjuster 14 the spring 13 is stretched and generates an upward force on the connecting head 5 and the television, thereby generating a counterclockwise elastic torque that counteracts the gravity torque, which in turn enables the television to be secured at this height regardless of the original height of the television, that is, the mounting bracket is in balance with the television. In the process of adjusting the height of the television, the distance between the connection point of the balance mechanism 1 and the base 2 or the upper arm 3 and the connection point of the balance mechanism 1 and the lower arm 4 changes, and since the sliding part 12 is slidably connected to the mounting part 11, the sliding part 12 therefore in this process can slide on the mounting part 11 such that the total length of the balance mechanism 11 is changed to adapt to the change in distance between the two connection points.

In addition, when monting different weights of televisions, the length of the spring 13 can be adjusted by operating the adjuster 14 to adjust the elastic torque generated by the spring 13, and the television and mounting bracket are always balanced.

Figure 3:
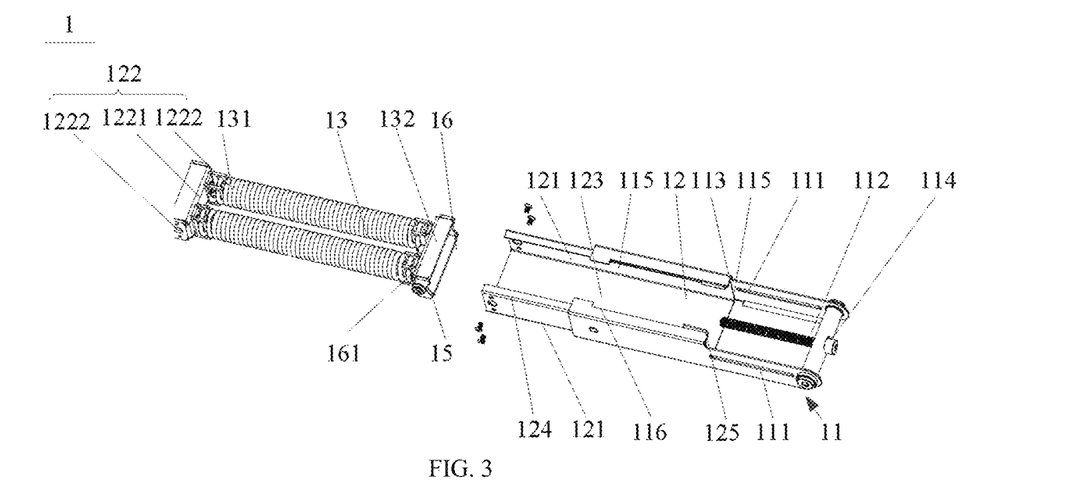
FIG. 3 is an exploded view of the balance mechanism shown in FIG. 1.

As shown in FIG. 3, in some embodiments, the mounting part 11 includes two first side plates 111 opposite to each other and a first bottom plate 112 fixed between the two first side plates 111, each of the two first side plates has a first flanging 113 arranged inward from the edge thereof; the sliding part 12 is located between the two first side plates 111, and the first flanging 113 is used to limit the sliding part 12. Thus, the sliding part 12 can slide between the two first side plates 111, while the first flanging 113 provided at the edge of the first side plate 111 can limit the sliding part 12, and therefore, the sliding part 12 can also be avoided from falling between the two first side plates 111 of the mounting part 11 along the direction perpendicular to the first bottom plate 112.

As shown in FIG. 3, in some embodiments, the sliding part 12 includes two second side plates 121 opposite to each other, and a first connecting member 122 fixed between the two second side plates 121, the first end 131 of the spring 13 is fixed to the first connector 122, and the second side plate 121 is located between the two first side plates 111. Specifically, the second side plate 121 is in contact with the first side plate 111. Thus, when the sliding part 12 slides on the mounting part 11, the second side plate 121 can slide on the first side plate 111.

Further, as shown in FIG. 3, the first connecting member 122 includes a U-shaped plate 1221 and connecting plates 1222 fixed to both ends of the U-shaped plate 1221, and the two connecting plates 1222 are fixedly connected to the two second side plates 121, respectively.

Further, as shown in FIG. 3, the sliding part 12 also includes a second bottom plate 123 fixed between the two second side plates 121, and the second bottom plate 123 is located at the edge of the two second side plates 121 toward the first bottom plate 112. The second bottom plate 123 is in contact with the first bottom plate 112.

Further, as shown in FIG. 3, each of the two second side plates 121 has a second flanging 124 arranged inward from the edge thereof, and the second flanging 124 is located inside the first flanging 113. In this way, the sliding part 12 can be better avoided from falling between the two first side plates 111 of the mounting part 11 along the direction perpendicular to the first bottom plate 112.

In some embodiments, as shown in FIGS. 1 and 3, each of the two first side plates 111 has a first sliding groove 1111 provided thereon; the balance mechanism 1 further includes a limiter 15, the limiter 15 is fixed to the second end 132 of the spring 13, and both ends of the limiter 15 are respectively located in the first sliding grooves 1111 of the two first side plates 111, respectively. When the balance mechanism 1 is in use, the first end 131 of the spring 13 is connected to the base 2 or the upper arm 3, and the end of the mounting part 11 away from the sliding part 12 is connected to the lower arm 4, and when the adjuster 14 is operated, the length of the spring 13 changes, when the first end 131 of the spring 13 is fixed, the second end 132 of the spring 13 generates a displacement, since the second end 132 of the spring 13 fixes the limiter 15, so the second end 132 of the spring 13 drives the limit piece 15 to move. When both ends of the limiter 15 are respectively located in the first sliding grooves 1111 of the two first side plates 111, the limiter 15 is moved along the first slider 1111 during moving, that is, the first sliding grooves 1111 can play a limiting role for the limiter 15 and can also play a limiting role for the movement of the second end 132 of the spring 13.

In some embodiments, as shown in FIG. 1, the mounting part 11 further includes a fixing member 114, which is fixed between the two first side plates 111, the outer surface of the adjuster 14 is provided with an external threads, and the adjuster 14 is arranged passing through the fixing member 114 in a ratatable manner; the second end 132 of the spring 13 is fixed with a second connecting member 16, and the second connecting member 16 is provided with an internal thread that matches with the external thread. In this way, when the length of the spring 13 needs to be changed by operating the adjuster 14, it can be achieved by rotating the adjuster 14. The position of the adjuster 14 on the fixing member 114 remains unchanged. Therefore, as the adjuster 14 rotates, the second connecting member 16 will move along the axis of the adjuster 14, the second connecting member 16 is fixed to the second end 132 of the spring 13, therefore, can also drive the second end 132 to move, and thereby adjust the length of the spring 13. The above technical solution makes the method of adjusting the length of the spring 13 relatively simple.

Further, as shown in FIG. 3, the structure of the second connecting member 16 can be the same as that of the first connecting member 122. A nut 161 is fixed on the U-shaped plate 1221 of the second connecting member 16, the internal thread of the nut 161 matchs with the external thread of adjuster 14.

The limiter 15 may be a limiting pin, and the limiting pin penetrates through the two connecting plates 1222 of the second connecting member 16, and extends out of the connecting plates 1222 to the first sliding groove 1111.

In some embodiments, as shown in FIG. 3, the first side plates 111 and the second side plates 121 each has a limiting structure 115 provided on both of, and the limiting structures 115 are configured to limit the displacement of the first side plates 111 relative to the second side plates 121. In this way, the limiting structure 115 can prevent the sliding part 12 from sliding out of the mounting part 11 during sliding on the mounting part 11.

Further, since the first side plate 111 is provided with a first flanging 113 and the second side plate 121 is provided with a second flanging 124, the limiting structure 115 can be provided on the first flanging 113 and the second flanging 124. Specifically, as shown in FIG. 3, an extension section 116 is provided on the first flanging 113, and a protrusion section 125 is provided on the second flanging 12, and the distance between the protrusion section 125 and the second bottom plate 123 is the same as the distance between the extension section 116 and the second bottom plate 123. In this way, when the sliding part 12 slides in a direction away from the mounting part 11, when the extension section 116 abuts the protrusion section 125, the sliding part 12 cannot continue to slide in this direction, thereby the displacement of the first side plate 111 relative to the second side plate 121 can be limited.

Figure 4:
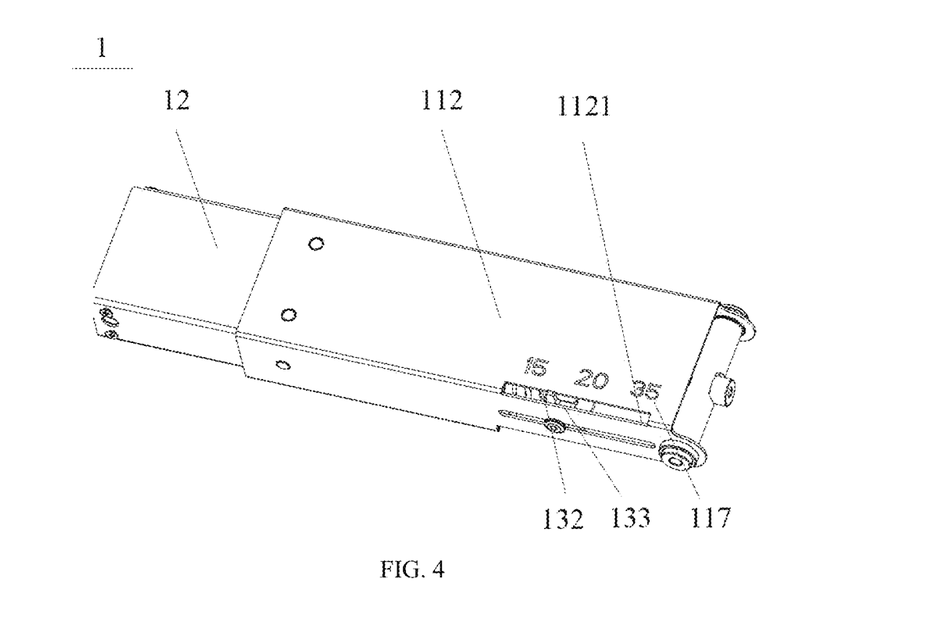
FIG. 4 is a schematic structural diagramm of a balance mechanism in the embodiment of present application from another perspective.

As shown in FIG. 4, in some embodiments, a second sliding groove 1121 is provided on the first bottom plate 112, and a protrusion 133 is provided on the second end 132 of the spring 13, and the protrusion 133 is located in the second sliding groove 1121; a scale 117 is provided on a surface of the first bottom plate 112 away from the first side plate 111. In this way, when the length of the spring 13 is adjusted by operating the adjuster 14, the second end 132 of the spring 13 is displaced, which can drive the protrusion 133 to slide in the second sliding groove 1121. Therefore, the user can intuitively observe the scale 117 corresponding to the television mounted on the mounting bracket by observing the scale 117 pointed to by the protrusion 133. Further, the scale 117 can indicate the weight of the television. Therefore, the user can know the weight of the television corresponding to the current length of the spring 13 by observing the scale 117.

In some embodiments, as shown in FIGS. 1 and 3, the number of springs 13 is at least two, and at least two springs 13 are arranged side by side. In this way, when the at least two springs 13 are deformed, the generated elastic torque is greater. Therefore, the weight range of the television, to which the mounting bracket of the balance mechanism 1 of the embodiment of the present application can be applied, is larger.

Figure 5:
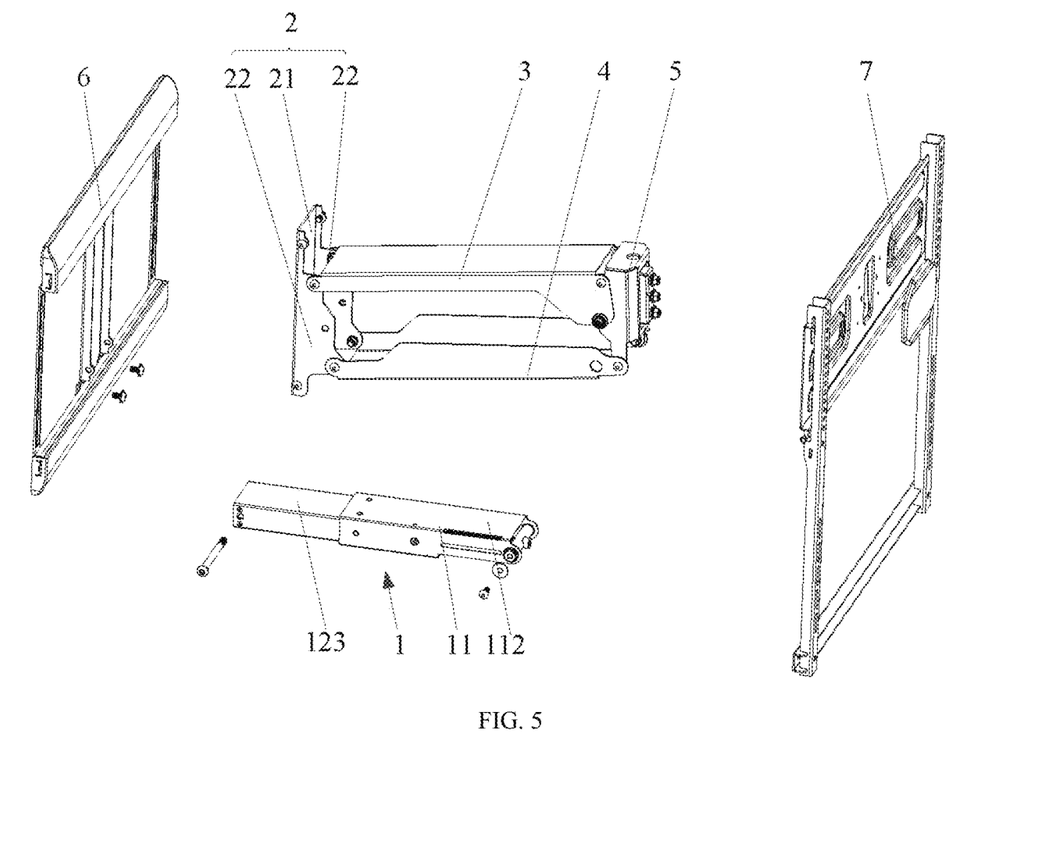
FIG. 5 is an exploded view of the mounting bracket shown in FIG. 2.

As shown in FIGS. 2 and 5, another aspect of the embodiments of the present application provides a mounting bracket, which includes: a base 2, a connecting head 5, an upper arm 3, a lower arm 4, and a balance mechanism 1 according to any of the foregoing technical solutions, the upper arm 3 and the lower arm 4 are both connected between the base 2 and the connecting head 5, a parallelogram structure is formed between the base 2, the connecting head 5, the upper arm 3 and the lower arm 4, and the first end 131 of the spring 13 of the balance mechanism 1 is connected to the base 2 or the upper arm 3, and the end of the mounting part 11 of the balance mechanism 1 away from the sliding part 12 is connected to the lower arm 4.

For the mounting bracket provided in the embodiment of the present application, the first end 131 of the spring 13 of the balance mechanism 1 is connected to the base 2 or the upper arm 3, and the end of the mounting part 11 away form the sliding part 12 is connected to the lower arm 4, and the connecting head 5 of the mounting bracket can fix the panel 7. When using the mounting bracket to secure the television on the wall 6, the base 2 can be secured to the wall 6 and the television is mounted on the panel 7. Thus, when the television is secured to the panel 7, the television has a downward trend and generate a clockwise gravitational torque under the action of its own gravity; at this time, by operating the adjuster 14 the spring 13 is stretched and generates an upward force on the connecting head 5 and the television, thereby generating a counterclockwise elastic torque that counteracts the gravity torque, which in turn enables the television to be secured at this height regardless of the original height of the television, that is, the mounting bracket is in balance with the television. In the process of adjusting the height of the television, the distance between the connection point of the balance mechanism 1 and the base 2 or the upper arm 3 and the connection point of the balance mechanism 1 and the lower arm 4 changes, and since the sliding part 12 is slidably connected to the mounting part 11, the sliding part 12 therefore in this process can slide on the mounting part 11 such that the total length of the balance mechanism 11 is changed to adapt to the change in distance between the two connection points.

Figure 6:
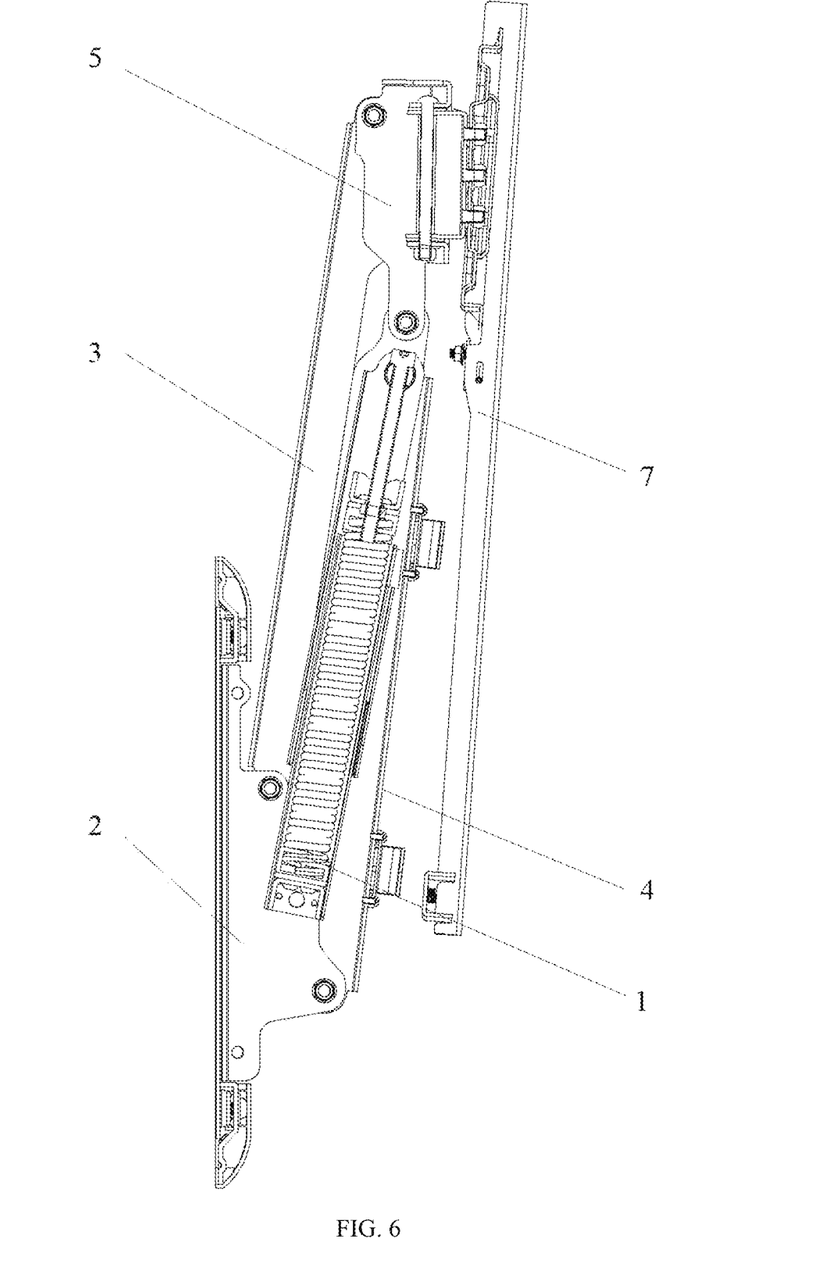
FIG. 6 is a schematic structural diagram of the mounting bracket of the present application in a second state.
Figure 7:
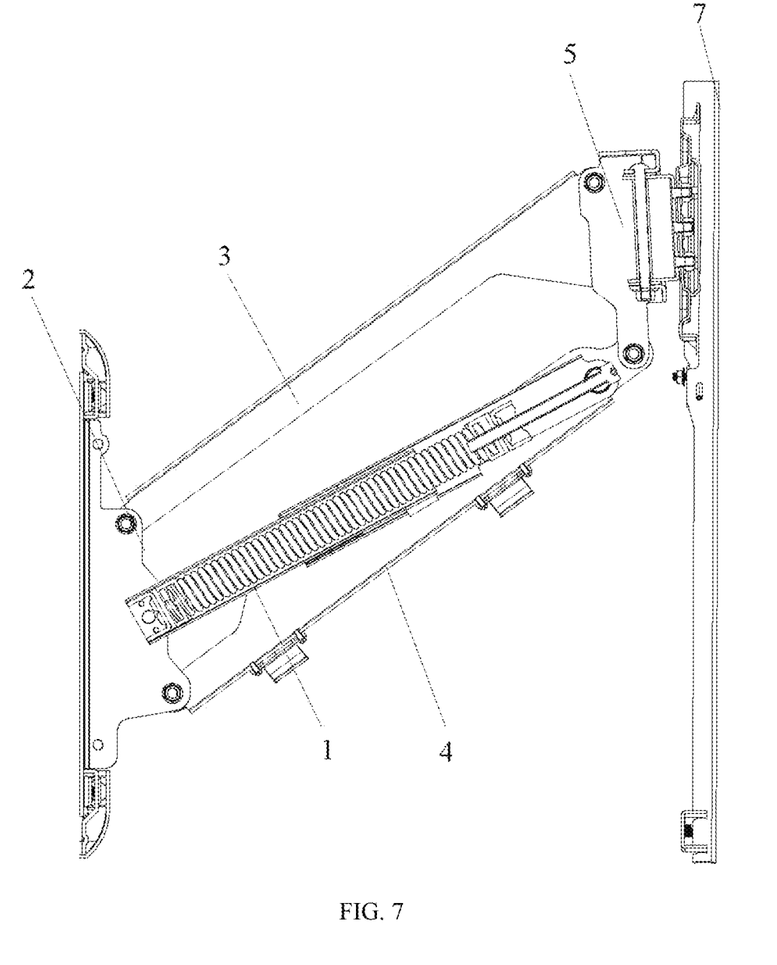
FIG. 7 is a schematic structural diagram of the mounting bracket of the present application in a third state.
Figure 8:
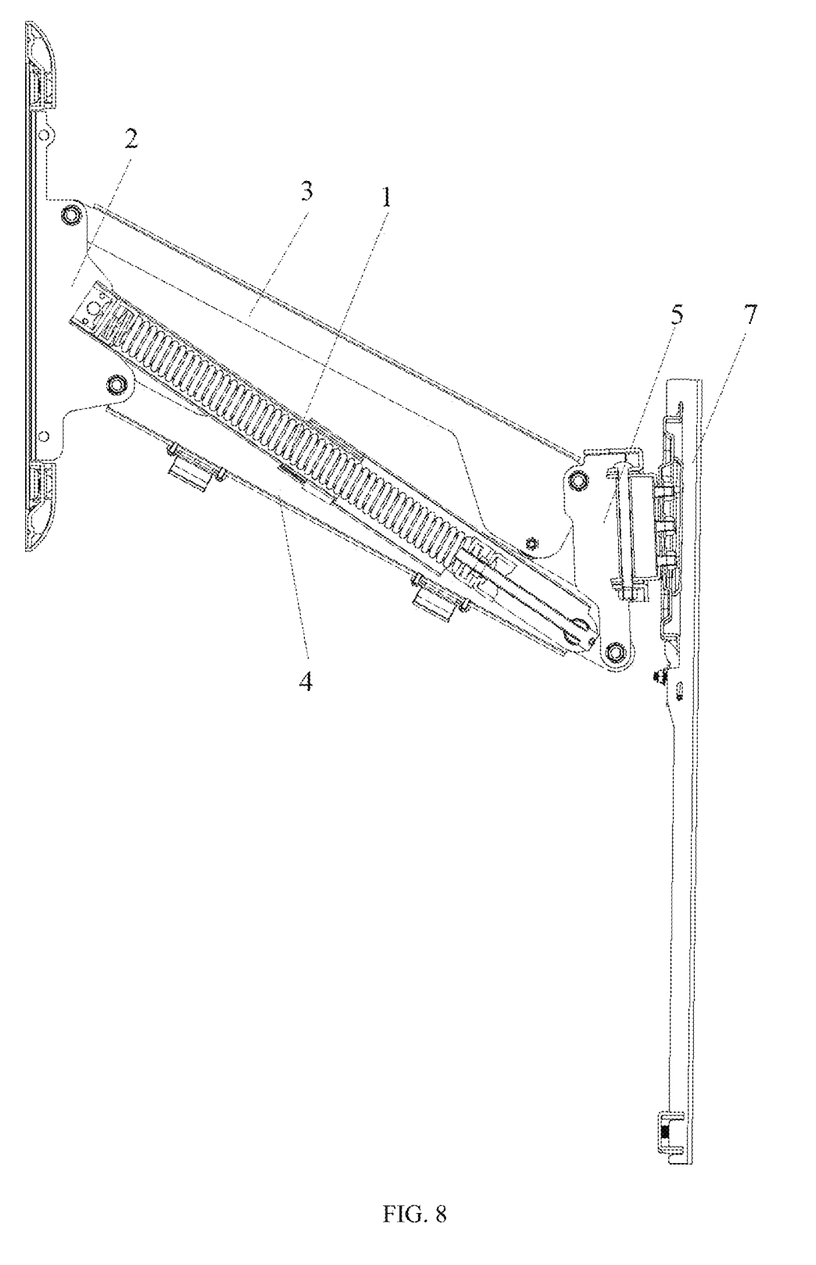
FIG. 8 is a schematic structural diagram of the mounting bracket of the present application in a fourth state.

As shown in FIG. 6, FIG. 7 and FIG. 8, the positions diagrams of the balance mechanism 1 corresponding to television of different heights are schematically shown.

Further, the upper arm 3 and the lower arm 4 are both hinged to the base 2, and the upper arm 3 and the lower arm 4 are both hinged to the connecting head 5.

As shown in FIG. 5, in some embodiments, the base 2 includes a third bottom plate 21 and two third side plates 22 fixed to the third bottom plate 21, and the balance mechanism 1 is connected between the two third side plates 22. In this way, the two sides of the balance mechanism 1 are respectively connected to the two third side plates 22, that is, the balance mechanism 1 is located in the middle of the entire mounting bracket, which can avoid an eccentric load of the mounting bracket when operating the adjusting element 14 to adjust the length of the spring 13.

Further, as shown in FIG. 5, the first bottom plate 112 of the mounting part 11 is located above the second bottom plate 123, in this way, the spring 13 located between the two second side plates 121 will be shielded by the first bottom plate 112 and the two first side plates 111 so that the spring 13 cannot be seen by the user, which can therefore make the mounting bracket more aesthetically pleasing.

The embodiment of the present application applies balance principle and structural mechanics analysis, combined with the characteristics of force value on the spring 13 to establish an objective function equation formula, and by using computer optimization analysis and considering the structural characteristics and application characteristics of the mounting bracket to calculate the structural dimensions of the upper arm 3 and the lower arm 4, the combination of related parameters of spring 13 and the mounting position of the spring 13 to achieve the effect of realizing a constant load bearing within a reasonable range of weight and a range of height adjustment. The mounting bracket of the embodiment of the present application is simple and convenient to adjust, and also has the advantages of low cost, simplicity and reliability, long life, safety and environmental protection.

The following is the process of applying the balance principle and structural mechanics analysis to establish the objective function equation formula.

Figure 9:
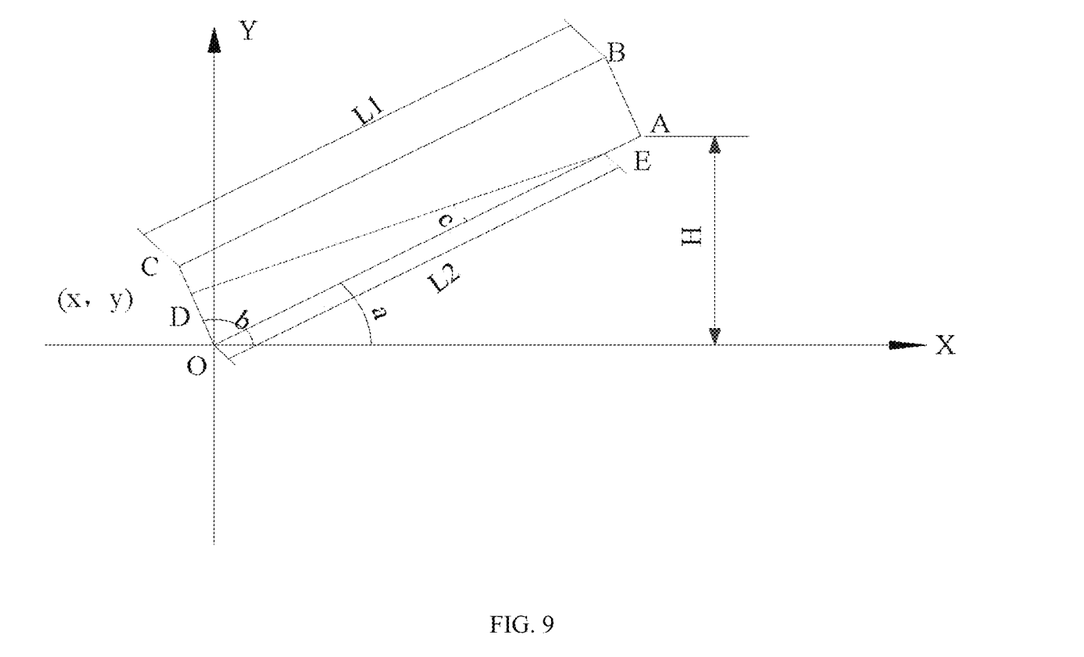
FIG. 9 is a diagramm showing the mechanical analysis of the mounting bracket shown in FIG. 2.

As shown in FIG. 9, the hinge point of the base 2 and the lower arm 4 are taken as the origin of the coordinate to establish a two-dimensional coordinate system.

DE refers to the mechanical spring 13, OC refers to the base 2, OA refers to the lower arm 4, AB refers to the connecting head 5, and BC refers to the upper arm 3.

Wherein the first end D of the spring 13 is on the base 2 (OC), and the second end E is on the lower arm 4 (OA).

Let L1 be the length of the upper arm 3 or the length of the lower arm 4 and L2 be the distance OE from the point E of the second end 132 of the spring 13 on the lower arm 4 to the origin O, and the point coordinate of the first end 131 of the spring 13 on the base 2 is (x, y), the angle between the lower arm 4 and the positive direction of X-axis of the horizontal plane is a, the angle between the distance OD and the positive direction of the X-axis of the horizontal plane is b, the angle between the spring 13 and the lower arm 4 is c, wherein the distance OD refers to a distance from the point D between the spring 13 and the base 2 to the origin.

Since the panel 7, on which the television is mounted, is mounted on the connecting head AB, in oder to make the TV to be stopped freely in height, the connecting head AB also needs to be freely stopped in height. Point A is taken as the analysis object.

In order to meet the requirements of different load-bearings and free stop in height, this balance system needs to meet the following two balances at the same time.

Balance 1: at the initial angle a0, the adjuster 14 is rotated to control the stretching amount X0 of the spring 13 to meet different load-bearings of the television.

In order to balance the TV in height, that is, the gravity torque M1 provided by gravity needs to be equal to the elastic torque M2 provided by the spring 13, that is, mg*L1*cos(a0)=k*X0*L2*sin(c), where m refers to the weight of the television, k refers to the stiffness coefficient of the spring 13, X0 refers to the initial stretch amount of the spring 13, and a0 refers to the angle of the initial position of the lower arm 4.

The calculation formula for the initial stretch amount of the spring 13 is obtained from the above formula, and the calculation formula is as follows:

$$X0 = \frac{mg * L1 * \cos(a0)}{k * L2 * \sin(c)}$$

according to the trigonometric formula:

$$c = \arccos \frac{L2^2 + (L_2 * \cos(a0) - x)^2 + (L_2 * \sin(a0) - y)^2 - (x^2 + y^2)}{2 * L_2 * \sqrt{(L_2 * \cos(a0) - x)^2 + (L_2 * \sin(a0) - y)^2}}$$

Through combining the aforementioned two formulas, the initial stretch amount of the spring 13 can be obtained:

$$X0 = \frac{mg * L1 * \cos(a0)}{k * L2 * \sin\left(\arccos \frac{L_2^2 + (L_2 * \cos(a0) - x)^2 + (L_2 * \sin(a0) - y)^2 - (x^2 + y^2)}{2 * L_2 * \sqrt{(L_2 * \cos(a0) - x)^2 + (L_2 * \sin(a0) - y)^2}}\right)}$$

Balance 2: in case that the weight is known, when adjusting the position of the television up and down, that is, when the angle a is changed, the balance also needs to be ensured.

According to the kinetic energy theorem, the work done by a force on an object during a process is equal to the change in the kinetic energy of the object during this process. That is, $\frac{1}{2}mv_2^2 - \frac{1}{2}mv_1^2 = W_{12}$.

Since the external force applied to the entire balance mechanism 1 during the movement comprises only the elastic force and the gravitational force. In oder to make it stop freely at any point in height within the range of motion, that is, at any angle a, after turning the angle $\Delta a$, the relationship between the previous velocity and the subsequent velocity is as follows: v2-v1=0, that is, the change in kinetic energy is 0. Therefore, at any angle a, the sum of the work done by the gravitational force and done by the elastic force is 0 in the process of turning down by angle $\Delta a$. In this process, the gravitational force does positive work and the elastic force does negative work. that is:

$$W_{gravitational\ force} - W_{elastic\ force} = 0$$

The work done by the gravitational force in this process is as follows:

$$W_{gravitational\ force} = mg*L1*(\sin a - (a+\Delta a))$$

The work done by the elastic force is as follows:

$$W_{elastic\ force} = \int_{x1}^{x2} kx\,dx = \frac{1}{2}k(x_2^2 - x_1^2)$$

Let m be the weight of the television, k be the stiffness coefficient of the spring 13, a0 be the angle of initial position, x1 be the corresponding stretch amount of the spring 13 when rotated by an angle a, x2 be the corresponding stretch amount of the spring 13 when rotated by an angle a+$\Delta a$, x0 be the initial stretch amount of the spring 13 corresponding to the weight m of the television.

At the initial position a0, the length of spring 13 is as follows:

$$DE = \sqrt[2]{x^2 + y^2 + L2^2 + 2*\sqrt{x^2 + y^2} * L2 * \cos(b - a0)}$$

At any angle a, the length of spring 13 is as follows:

$$DE = \sqrt[2]{x^2 + y^2 + L2^2 + 2*\sqrt{x^2 + y^2} * L2 * \cos(b - a)}$$

At this time, the corresponding stretch amount of the spring 13 at any angle a is as follows:

$$x1 = \sqrt[2]{x^2 + y^2 + L2^2 + 2*\sqrt{x^2 + y^2} * L2 * \cos(b - a)} - \sqrt[2]{x^2 + y^2 + L2^2 + 2*\sqrt{x^2 + y^2} * L2 * \cos(b - a0)} + X0$$

When rotated by an angle a+$\Delta a$, the corresponding stretch amount of the spring 13 is as follows:

$$x2 = \sqrt[2]{x^2 + y^2 + L2^2 + 2*\sqrt{x^2 + y^2} * L2 * \cos(b - a - \Delta a)} - \sqrt[2]{x^2 + y^2 + L2^2 + 2*\sqrt{x^2 + y^2} * L2 * \cos(b - a0)} + X0$$

Through substituting the above formulas into the elastic force work formula, it can be obtained:

$$W_{gravitational\ force} = \frac{1}{2}k\left(\left(\sqrt[2]{x^2 + y^2 + L2^2 + 2*\sqrt{x^2 + y^2} * L2 * \cos(b - a - \Delta a)} - \sqrt[2]{x^2 + y^2 + L2^2 + 2*\sqrt{x^2 + y^2} * L2 * \cos(b - a0)} + X0\right)^2 - \left(\sqrt[2]{x^2 + y^2 + L2^2 + 2*\sqrt{x^2 + y^2} * L2 * \cos(b - a)} - \sqrt[2]{x^2 + y^2 + L2^2 + 2*\sqrt{x^2 + y^2} * L2 * \cos(b - a0)} + X0\right)^2\right)$$

Thus during this movement the gravitational force does positive work and the elastic force does negative work, that is: $W_{12} = W_{gravitational\ force} - W_{elastic\ force}$.

In an ideal state, $W_{12}=0$, that is, the work done by the gravitational force=the work done by the elastic force, then at any angle a, balance is reached.

$W_{12}>0$, that is, the work done by the gravitational force>the work done by elastic force, then at any angle a, the television is lowered.

$W_{12}<0$, that is, the work done by the gravitational force<the work done by elastic force, then at any angle a, the television is raised.

In the actual situation, due to the participation of external factors such as friction, it is not necessary for $W_{12}=0$ to achieve equilibrium at any angle a, and it can fluctuate up and down on the line of $W_{12}=0$.

Based on the above formulas, the analysis is optimized in a computer, it is assumed that the stiffness coefficient of the spring 13 is k, the weight of the television is m, the point of the first end 131 of spring 13 located on the base 2 is (x, y), and the slight amount of rotation of the lower arm 14 at any angle a is $\Delta a$. The value of $W_{12}$ at any angle a can be obtained, and thereby a series of values of $W_{12}$ within the rotation range of a can be obtained to form a curve. The theory requires that it can be guaranteed to freely stop at any point in height as this curve is at y=0. However, there are actually inevitable friction factors, and the curve may fluctuate up and down at the line y=0. In this way, the point (x, y) of the first end 131 of the spring 13 at the base 2 is obtained inversely, and thereby the mounting position of the spring 13 is determined.

Figure 10:
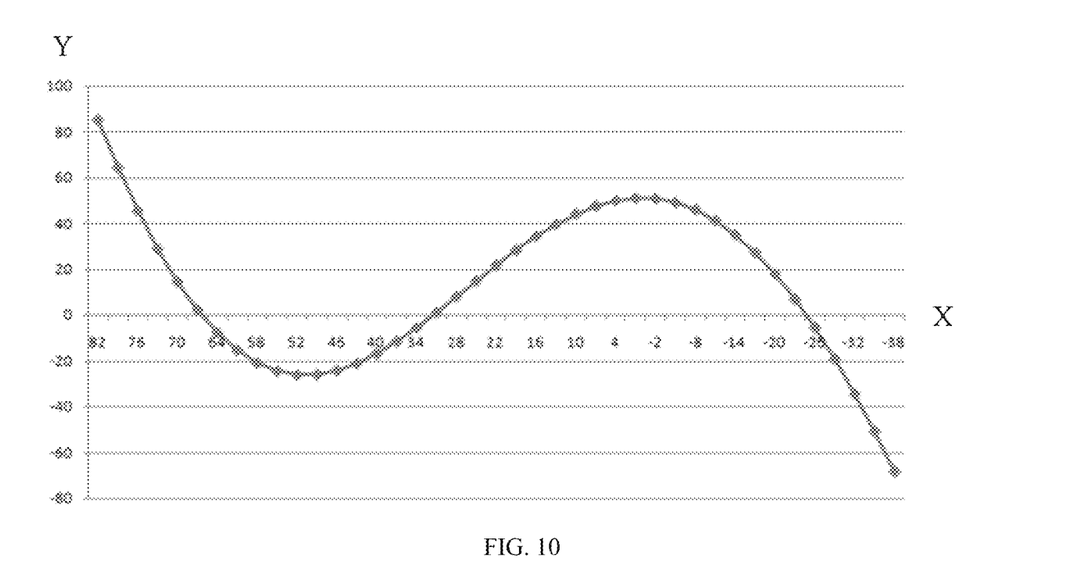
FIG. 10 is a diagramm showing the test results of elastic work and gravity work of the mounting bracket shown in FIG. 2.

As shown in FIG. 10, when the rotation range a is (−38°, 82°), the stiffness coefficient k of the spring 13 is 8.3, the mass of the television is 14 kg, and the first end 131 of the spring 13 is at the point (x, y) on the base 2, in the case of a small amount of rotation $\Delta a=1°$ of the lower arms 4 at any angle a, the initial stretch amount X0 of the spring 13 and the curve value of $W_{12}$ can be obtained, wherein X0=25 mm. In FIG. 10, the abscissa refers to the rotation range a, and the ordinate refers to $W_{12}$.

At this time, after the point (x, y) of the first end 131 of the spring 13 at the base 2 is determined, only by changing the initial stretch amount X0 to adapt to the weight m of the television with different load-bearing capacity, and thereby a mounting bracket with adjustable load-bearing capacity and free stop in height is realized.

It should be noted that in this article, relational terms such as first and second are only used to distinguish one entity or operation from another entity or operation, and do not necessarily require or imply that any such actual relationship or sequence exists between these entities or operations.one. Moreover, the terms "include", "comprise" or any other variants thereof are intended to cover non-exclusive inclusion, so that a process, method, article or device including a series of elements not only includes those elements, but also includes those that are not explicitly listed, or also include elements inherent to this process, method, article or equipment. If there are no more restrictions, the element defined by the sentence "including a . . ." does not exclude the existence of other identical elements in the process, method, article, or equipment that includes the said elements.

The foregoing descriptions are only preferred embodiments of the present application, and are not used to limit the protection scope of the present application. Any modification, equivalent replacement, improvement, etc. made within the spirit and principle of the present application are all included in the protection scope of the present application.

The invention claimed is:

1. A balance mechanism, comprising:
a mounting part;
a sliding part, which is slidably connected to the mounting part, wherein the sliding part slides on the mounting part such that a total length of the balance mechanism is changed;
a spring, a first end of which is fixed to the sliding part;
an adjuster, which has a third end and a fourth end opposite to the third end, the third end is connected to the mounting part, and the fourth end is connected to a second end of the spring, the adjuster is configured to adjust the spring, so as to stretch and compress the spring; wherein the mounting part comprises two first side plates opposite to each other and a first bottom plate fixed between the two first side plates, wherein each of the two first side plates has a first flanging arranged inward from the edge thereof;
the sliding part is located between the two first side plates, and the first flanging is used to limit the sliding part.

2. The balance mechanism according to claim 1, wherein the sliding part comprises two second side plates opposite to each other, and a first connector fixed between the two second side plates, wherein the first end of the spring is fixed to the first connector, and the second side plates are located between the two first side plates.

3. The balance mechanism according to claim 2, wherein the sliding part further comprises a fixing member fixed between the two second side plates, an external thread is provided on an outer surface of the adjuster, and the adjuster is arranged to pass through the fixing member in a rotatable manner;
the second end of the spring is fixed with a second connector, and the second connector is provided with an internal thread, which matches with the external thread.

4. The balance mechanism according to claim 2, wherein the first side plates and the second side plates each has a limiting structure provided thereon, and the limiting structures are configured to limit the displacement of the first side plates relative to the second side plates.

5. The balance mechanism according to claim 1, wherein each of the two first side plates has a first sliding groove provided thereon;
the balance mechanism further comprises a limiter, wherein the limiter is fixed to the second end of the spring, and both ends of the limiter are respectively located in the first sliding grooves of the two first side plates.

6. The balance mechanism according to claim 1, wherein a second sliding groove is provided on the first bottom plate, a protrusion is provided on the second end of the spring, and the protrusion is located in the second sliding groove;

a scale is provided on a surface of the first bottom plate away from the first side plates.

7. The balance mechanism according to claim 1, wherein the number of the springs is at least two, and the at least two springs are arranged side by side.

8. A mounting bracket, comprising: a base, a connecting head, an upper arm, a lower arm and a balance mechanism comprising:
a mounting part;
a sliding part, which is slidably connected to the mounting part, wherein the sliding part slides on the mounting part such that a total length of the balance mechanism is changed;
a spring, a first end of which is fixed to the sliding part;
an adjuster, which has a third end and a fourth end opposite to the third end, the third end is connected to the mounting part, and the fourth end is connected to a second end of the spring, the adjuster is configured to adjust the spring, so as to stretch and compress the spring,
the upper arm and the lower arm both are connected between the base and the connecting head, a parallelogram quadrilateral structure is formed between the base, the connecting head, the upper arm and the lower arm, the first end of the spring of the balance mechanism is connected to the base or the upper arm, and an end of the mounting part of the balance mechanism away from the sliding part is connected to the lower arm.

9. The mounting bracket according to claim 8, wherein the base comprises a third bottom plate and two third side plates fixed to the third bottom plate, and the balance mechanism is connected between the two third side plates.

10. The mounting bracket according to claim 8, wherein the mounting part comprises two first side plates opposite to each other and a first bottom plate fixed between the two first side plates, wherein each of the two first side plates has a first flanging arranged inward from the edge thereof;
the sliding part is located between the two first side plates, and the first flanging is used to limit the sliding part.

11. The mounting bracket according to claim 10, wherein the sliding part comprises two second side plates opposite to each other, and a first connector fixed between the two second side plates, wherein the first end of the spring is fixed to the first connector, and the second side plates are located between the two first side plates.

12. The mounting bracket according to claim 11, wherein the sliding part further comprises a fixing member fixed between the two second side plates, an external thread is provided on an outer surface of the adjuster, and the adjuster is arranged to pass through the fixing member in a rotatable manner;
the second end of the spring is fixed with a second connector, and the second connector is provided with an internal thread, which matches with the external thread.

13. The mounting bracket according to claim 11, wherein the first side plates and the second side plates each has a limiting structure provided thereon, and the limiting structures are configured to limit the displacement of the first side plates relative to the second side plates.

14. The mounting bracket according to claim 10, wherein each of the two first side plates has a first sliding groove provided thereon;
the balance mechanism further comprises a limiter, wherein the limiter is fixed to the second end of the spring, and both ends of the limiter are respectively located in the first sliding grooves of the two first side plates.

15. The mounting bracket according to claim 10, wherein a second sliding groove is provided on the first bottom plate, a protrusion is provided on the second end of the spring, and the protrusion is located in the second sliding groove;
a scale is provided on a surface of the first bottom plate away from the first side plates.

16. The mounting bracket according to claim 8, wherein the number of the springs is at least two, and the at least two springs are arranged side by side.

\* \* \* \* \*

UNITED STATES PATENT AND TRADEMARK OFFICE
CERTIFICATE OF CORRECTION

PATENT NO. : 11,920,726 B2  
APPLICATION NO. : 17/393570  
DATED : March 5, 2024  
INVENTOR(S) : Xiaodong You et al.

Page 1 of 1

It is certified that error appears in the above-identified patent and that said Letters Patent is hereby corrected as shown below:

In the Specification

In Column 8, Lines 56-62 (Approx.), delete

"$$X0 = \frac{mg * L1 * \cos(a0)}{k * L2 * \sin\left(\arccos\frac{L_2^2 + (L_2 * \cos(a0) - x)^2 + (L_2 * \sin(a0) - y)^2 - (x^2 + y^2)}{2 * L_2 * \sqrt{(L_2 * \cos(a0) - x)^2 + (L_2 * \sin(a0) - y)^2}}\right)}$$" and insert $$--X0 = \frac{mg*L1*\cos(a0)}{k*L2*\sin}\left(\arccos\frac{L2^2+(L_2*\cos(a0)-x)^2+(L_2*\sin(a0)-y)^2-(x^2+y^2)}{2*L_2*\sqrt{(L_2*\cos(a0)-x)^2+(L_2*\sin(a0)-y)^2}}\right)--$$

In Column 9, Line 24 (Approx.), delete "(sin a-(a+Δa))" and insert --(sin a − sin(a + Δa))--.

In Column 9, Line 27 (Approx.), delete "kxdx=½k($x_2^2$−$x_1^2$)" and insert $--kxdx = 1/2\, k(x_2^2 - x_1^2)--$.

In the Claims

In Column 12, Claim 8, Lines 23-24, delete "parallelogram quadrilateral" and insert --parallelogram--.

Signed and Sealed this  
Second Day of July, 2024

*Katherine Kelly Vidal*

Katherine Kelly Vidal  
*Director of the United States Patent and Trademark Office*